United States Patent
Hisano et al.

(10) Patent No.: US 8,784,983 B2
(45) Date of Patent: Jul. 22, 2014

(54) EXPANDED POROUS POLYTETRAFLUOROETHYLENE FILM-LAMINATED SHEET, AND GASKET COMPOSED OF SAID SHEET

(75) Inventors: Hirokaze Hisano, Tokyo (JP); Shinichi Urakami, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 405 days.

(21) Appl. No.: 12/678,551

(22) PCT Filed: Sep. 19, 2008

(86) PCT No.: PCT/JP2008/066995
§ 371 (c)(1),
(2), (4) Date: May 27, 2010

(87) PCT Pub. No.: WO2009/038181
PCT Pub. Date: Mar. 26, 2009

(65) Prior Publication Data
US 2010/0283214 A1    Nov. 11, 2010

(30) Foreign Application Priority Data
Sep. 20, 2007 (JP) ................. 2007-244334

(51) Int. Cl.
*B32B 5/32*    (2006.01)
*B32B 5/24*    (2006.01)
(52) U.S. Cl.
USPC .............. 428/316.6; 428/319.3; 428/319.7; 428/315.5; 428/315.7

(58) Field of Classification Search
USPC .......... 428/316.6, 319.3, 319.7, 315.5, 315.7
See application file for complete search history.

(56) References Cited

U.S. PATENT DOCUMENTS

| | | | |
|---|---|---|---|
| 4,187,390 A | | 2/1980 | Gore |
| 5,094,895 A | * | 3/1992 | Branca et al. .............. 428/36.91 |
| 5,964,465 A | | 10/1999 | Mills et al. |
| 6,080,472 A | | 6/2000 | Huang et al. |
| 2004/0173978 A1 | | 9/2004 | Bowen et al. |
| 2007/0012624 A1 | * | 1/2007 | Bacino et al. ................. 210/650 |

FOREIGN PATENT DOCUMENTS

| | | |
|---|---|---|
| JP | 46-7284 | 12/1971 |
| JP | 3-89133 | 9/1991 |
| JP | 3-221541 | 9/1991 |
| JP | 10-237203 | 9/1998 |
| JP | 11-80705 | 3/1999 |
| JP | 2006-524283 | 10/2006 |

OTHER PUBLICATIONS

International Search Report, PCT/JP2008/066995, Dec. 8, 2008, no written opinion, 2 pages.

* cited by examiner

*Primary Examiner* — Hai Vo
(74) *Attorney, Agent, or Firm* — Amy L. Miller (57) ABSTRACT

The laminated sheet of this invention is a sheet including expanded porous polytetrafluoroethylene films laminated by thermal compression bonding, wherein the sheet has a specific surface area of 9.0 m²/g or larger and a density of from 0.4 g/cm³ to lower than 0.75 g/cm³, thereby making it possible to improve both the creep resistance and the adhesiveness between the films of the expanded porous PTFE film-laminated sheet.

15 Claims, 4 Drawing Sheets

FIG. 1

PRIOR ART

FIG. 2

PRIOR ART

EXPANDED POROUS POLYTETRAFLUOROETHYLENE FILM-LAMINATED SHEET, AND GASKET COMPOSED OF SAID SHEET

TECHNICAL FIELD

This invention relates to a sheet obtained by laminating expanded porous polytetrafluoroethylene films (hereinafter referred to as ePTFE films) having excellent chemical resistance.

BACKGROUND ART ePTFE sheets obtained by laminating expanded porous polytetrafluoroethylene films to a prescribed thickness have excellent characteristics provided by polytetrafluoroethylene materials (hereinafter referred to as PTFE), such as chemical resistance, heat resistance, purity, and smoothness. In addition, as a result of making PTFE porous by expansion, the ePTFE sheets have excellent toughness, cushioning properties, and heat insulation properties. Therefore, the ePTFE sheets have been used in various fields including cushioning materials, heat insulation materials, slide materials, and various cover materials. In particular, gaskets are one of the representative applications of the ePTFE sheets.

Figure 1:
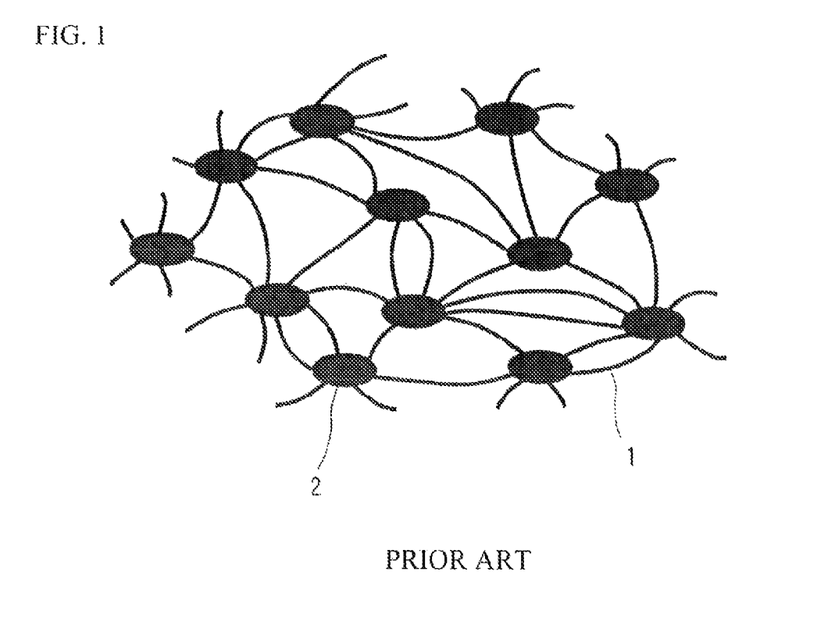
FIG. 1 is a conceptual diagram showing a node-fibril structure in one example of the conventional ePTFE film-laminated sheets.

It has been known that gaskets (hereinafter referred to as ePTFE sheet gaskets), which are cut out from a sheet obtained by layering expanded porous polytetrafluoroethylene (ePTFE) films to a prescribed thickness and integrating the layered ePTFE films by thermal compression bonding, has improved creep resistance and also has excellent fitting properties, when compared to skived PTFE gaskets obtained by cutting out from a compression-molded product obtained from a PTFE molding powder (e.g., Japanese Utility Model Laid-Open Publication No. 03-89133 and Japanese Patent Laid-Open Publication No. 10-237203). ePTFE films are obtained by molding a mixture of a PTFE fine powder and a lubricant, removing the lubricant, expanding an obtained product at a high temperature, and if necessary, baking an obtained product (Japanese Patent Laid-Open Publication No. 46-7284). As shown in FIG. 1, biaxially-expanded ePTFE films are formed of nodes (connections) 2, which are scattered about in an island-like pattern, and fibrils 1, which connect these nodes 2 and which are extended all around in a mesh pattern. The nodes 2 are identified as folded crystals of PTFE. It is thought that the fibrils 1 are linear molecule chains resulting from this fold being unraveled and pulled out by expansion. The above-described sheets obtained by laminating ePTFE films (hereinafter referred to as ePTFE film-laminated sheets) have improved creep resistance when compared to skived PTFE sheets; however, a further improvement in their creep resistance has been desired.

Figure 2:
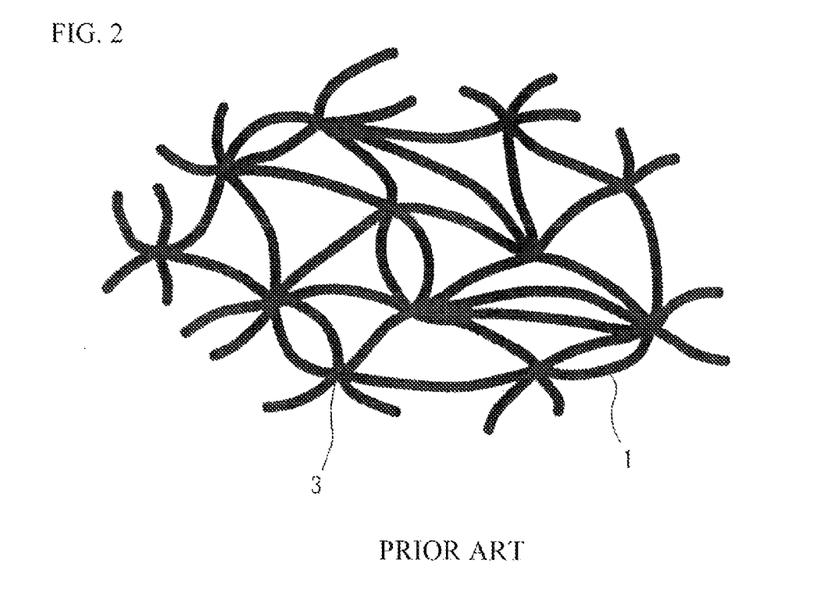
FIG. 2 is a conceptual diagram showing a node-fibril structure in another example of the conventional ePTFE film-laminated sheets.

In Japanese Patent Laid-Open Publication No. 11-80705 and Japanese Patent Laid-Open Publication No. 2006-524283, it has been found that creeping is caused by nodes, and it has been proposed that creep resistance can be improved by making the nodes as small as possible. Thus, ePTFE sheet gaskets in which a large amount of fibrils were pulled out by increasing expansion ratios have been developed in Japanese Patent Laid-Open Publication No. 11-80705 and Japanese Patent Laid-Open Publication No. 2006-524283. As shown in FIG. 2, in these ePTFE sheet gaskets, nodes 3 connected by fibrils 1 are made extremely small and have a structure which cannot be called "nodes" any more (hereinafter, such a structure is referred to sometimes as a node-less structure).

DISCLOSURE OF THE INVENTION

However, according to the present inventors' studies, it has been found that adhesiveness between ePTFE films is decreased in Japanese Patent Laid-Open Publication No. 11-80705 and Japanese Patent Laid-Open Publication No. 2006-524283. Sheet gaskets are often made by punching out a prescribed shape from an ePTFE film-laminated product (also referred to as, for example, a sheet material or a laminate) by using a Thomson die cutter. The Thomson die cutter is a die cutter in which a cutter for cutting out is vertically protruded from a plate material serving as a base, and since a cutter joint exists due to the structure of the Thompson die cutter, cut residues are often generated at this joint portion. When cut residues are generated, punched-out gaskets are pulled and torn away from the sheet, and therefore, there occur no troubles at this stage in the case of ordinary sheet gaskets. However, in the case of ePTFE sheet gaskets, since ePTFE films have very high tensile strength, if adhesiveness between ePTFE films is small, cut parts and cut residues are peeled before the cut residues are pulled and torn away, thereby causing deterioration in the productivity of the sheet gaskets. In addition, there is also a possibility that the films may be peeled during their use as gaskets.

This invention has been made by focusing on the situations as described above, and an object of this invention is to provide an expanded porous PTFE film-laminated sheet, which can have both improved creep resistance and improved adhesiveness between ePTFE films, and a gasket composed of this sheet.

Fibrils correspond to PTFE molecules having a high degree of crystallization, whereas nodes are in an amorphous state. These nodes are easily plastically deformed by compression stress, which causes creeping. Thus, in Japanese Patent Laid-Open Publication No. 11-80705 and Japanese Patent Laid-Open Publication No. 2006-524283, creep resistance is improved by increasing expansion ratios to make nodes as small as possible. However, it is thought that nodes play an important role in adhesion between ePTFE films. As described above, since nodes are in an amorphous state, they are softened (deformed) at lower temperatures when compared to fibrils. Therefore, when ePTFE films are laminated by thermal compression bonding, thermal bonding can be carried out, between nodes easily softened by heat, or between nodes and fibrils. The adhesiveness between ePTFE films is decreased when nodes are made small to improve creep resistance. Therefore, a further change in thinking has been needed to improve both characteristics, i.e., creep resistance and adhesiveness between ePTFE films.

The present inventors have intensively studied to solve the above-described problem, and as a result, they have found that even when the sizes of nodes are reduced to improve creep resistance, if these small nodes are generated in large numbers and the amount of fibrils is also increased, adhesiveness between ePTFE films can also be improved, while keeping improved creep resistance. However, when nodes are made small and the amount of fibrils is increased, it becomes difficult to distinguish between the nodes and the fibrils. In addition, when observed by a scanning electron microscope, a large number of nodes and fibrils are observed as being overlaid on one another in the direction of observation, and therefore, it is difficult to show this new structure directly and objectively. Thus, the present inventors have further studied, and as a result, they have found that when small nodes are generated in large numbers and the amount of fibrils is increased, the specific surface area of ePTFE is also increased, and that when the ePTFE is managed from such a viewpoint, both creep resistance and adhesiveness between ePTFE films can surely be improved. These findings have led to the completion of this invention.

That is, the expanded porous polytetrafluoroethylene film-laminated sheet according to this invention comprises expanded porous polytetrafluoroethylene films laminated by thermal compression bonding, and has a feature in that the sheet has a specific surface area of $9.0$ $m^2/g$ or higher and a density of from $0.4$ $g/cm^3$ to lower than $0.75$ $g/cm^3$. This sheet may have a matrix strength of, for example, 120 MPa or higher, in at least one direction among in-plain directions of the sheet and may have a ratio of matrix strengths of, for example, from 0.5 to 2, in two orthogonal directions among in-plain directions of the sheet. In addition, the sheet may have a 180-degree peeling strength of, for example, 0.20 N/mm or higher, between the films at the center in the thickness direction of the sheet. Furthermore, the sheet may have a stress-relaxation rate of, for example, 45% or lower, after 1 hour when compressed at a surface pressure of 50 MPa.

The above-described expanded porous polytetrafluoroethylene film can be produced by paste extruding a polytetrafluoroethylene fine powder at a reduction ratio of 100 or higher, expanding an obtained tape at an expansion speed of 100%/sec or higher and at an expansion ratio of 3 times or higher in a machine direction of the tape, and then expanding the tape at an expansion speed of 50%/sec or higher and at an expansion ratio of 10 times or higher in a transverse direction of the tape.

The above-described expanded porous polytetrafluoroethylene film-laminated sheet may be consolidated, so that the consolidated sheet may have a density of from $0.75$ $g/cm^3$ to $2.2$ $g/cm^3$. In addition, a fluororesin layer having a density of $1.6$ $g/cm^3$ or higher may be formed on a surface, or as an intermediate layer, of the expanded porous polytetrafluoroethylene sheet (the obtained sheet may be referred to as a composite sheet).

This invention includes a gasket. This gasket comprises an irregularity-fitting portion (a portion following irregularity on a seal face) composed of the above-described expanded porous polytetrafluoroethylene film-laminated sheet or the above-described composite sheet.

BEST MODE FOR CARRYING OUT THE INVENTION

The laminated sheet of this invention is one obtained by laminating expanded porous PTFE films (e.g., biaxially-expanded porous PTFE films) by thermal compression bonding. In this invention, the structure of ePTFE is controlled under an idea that even while making nodes small in these expanded porous PTFE films (ePTFE films), both the total area of nodes and the amount of fibrils are increased by increasing the number density of nodes. If the structure of ePTFE is controlled in such a manner, there can be obtained an ePTFE film-laminated sheet having high strength and low creep without deteriorating adhesive properties.

Describing in more detail, usually, a PTFE fine powder is paste extruded and an obtained tape is extruded to produce PTFE made porous (expanded porous PTFE). This PTFE is a resin which does not melt even at temperatures equal to or higher than the melting point thereof, and has a unique expansion mechanism. This is, in the fine powder (PTFE particles), two or more PTFE molecular chains are aggregated in a ribbon-like shape to form a structure (lamellae), and these lamellae are folded in a cylindrical bale-like shape to form a primary particle, and two or more primary particles are aggregated to form a secondary particle. In the extrusion step, the PTFE particles are subjected to strong shearing force. This shearing force forms an entanglement of the PTFE film molecular chains between the primary particles of the PTFE (entangling between the lamellae). If the entanglement of the PTFE molecular chains has once been caused between the primary particles, it becomes possible to split the secondary particles while pulling out the folded crystals (lamellae) from the insides of the primary particles in the expansion step, so that the PTFE is made porous. The entanglement points of the primary particles are thought to be generated in two or more sites which are close to one another. Furthermore, fibrils observed by, for example, a scanning electron microscope (SEM), are thought to be a result of two or more lamellae being pulled out in a constant direction from two or more points, and being aggregated. The nodes are thought to be aggregations (secondary particles) of two or more primary particles which have remained without being split in the expansion step.

In the above-described mechanism of making PTFE porous by expansion, the present inventors have focused on the shearing force in the extrusion step, and on the expansion ratio and the expansion speed in the expansion step. The number of entanglement points of the PTFE molecular chains between the PTFE primary particles is more increased as the shearing force is made larger. In addition, a phenomenon where the fibrils are further pulled out from binding sites (connection points) of the nodes and the fibrils, and a phenomenon where the PTFE secondary particles are split, are simultaneously occurring in the expansion step. A ratio of these phenomena may vary depending on the expansion speed. For example, the ratio of the phenomenon of the fibrils being pulled out is increased if expansion is carried out at a low speed, whereas the ratio of the phenomenon of the splitting of the PTFE secondary particles is increased if expansion is carried out at a high speed. Furthermore, the pulling out of the fibrils and the splitting of the secondary particles more highly occur as the expansion ratio is made higher. The present inventors have repeated researches and experiments to reach such an estimated mechanism. As a result, the present inventors have found that it becomes possible to make nodes small, and to increase the number of nodes and the number of fibrils, by applying a large shearing force in the extrusion step and by carrying out expansion at a high speed and at a high ratio in the expansion step.

That is, when the shearing force applied in the extrusion step is small, even if expansion is carried out at a high speed and at a high ratio, it only leads to an increase in distance between primary particles which do not have entanglement points. This results in a decrease in the number of fibrils, and a decrease in strength, instead of their increase. In addition, even when the shearing force applied in the extrusion step is small, if expansion is carried out at a low speed and a high ratio, it is possible to extend fibrils in an elongated manner while suppressing the splitting of secondary particles. This results in an improvement both in strength and in creep resistance. However, in this case, the number of nodes is decreased and the sizes of the nodes are reduced, and adhesive properties are deteriorated. In contrast to these, if a large shearing force has been applied in the extrusion step, even when the splitting of secondary particles occurs due to expanding by high-speed and high-ratio expansion, fibrils are generated between the primary particles, thereby making it possible to ensure the necessary number of fibrils and to improve both strength and creep resistance. In addition, adhesive properties can also be improved because both the number of nodes and the number of fibrils are large.

Figure 3:
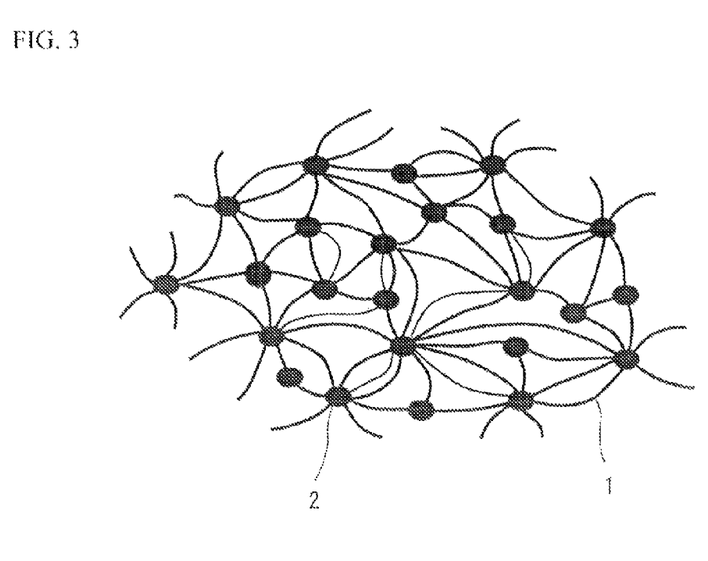
FIG. 3 is a conceptual diagram showing a node-fibril structure in one example of the ePTFE film-laminated sheet of this invention.

As described above, the idea of this invention is to increase the numbers of nodes and fibrils while making the nodes small. An observation of a scanning electron microscope photograph gives an impression that small nodes and fibrils are indeed increased in the ePTFE film of this invention. FIG. 3 conceptually shows this structure, and represents that small nodes 2 are formed in large numbers and the number of fibrils 1 is also large when compared to FIGS. 1 and 2. However, it is difficult to show (quantify) this new structure directly and objectively. The reasons for this are, for example, as follows: when nodes are made small to increase the amount of fibrils, the boundaries between the nodes and the fibrils become ambiguous, thereby making it difficult to clearly distinguish between the nodes and the fibrils; and when observed by a scanning electron microscope, large number of nodes and fibrils are observed as being overlaid on one another in the direction of observation, thereby making it not possible to distinguish between the front side and the rear side very well.

For the purpose of representing the above-described new structure quantitatively, it is suitable to utilize a specific surface area. When shearing force is decreased in the extrusion step and expansion is carried out at a low speed, even if fibrils are elongated by increasing an expansion ratio, there occurs a state in which a large number of lamellae are aggregated by electrostatic force because two or more lamellae have been pulled out in a constant direction from two or more entanglement points generated in the extrusion step and close to one another and have been elongated. On the other hand, when shearing force is increased in the extrusion step and expansion is carried out at a high speed, the aggregation of lamellae is suppressed because short lamellae are extended in various directions. Therefore, when compared to the former case, the surface areas of fibrils become larger, and when ePTFE films (ePTFE film-laminated sheets) are observed on the whole, their specific surface areas also become larger in the latter case.

Accordingly, the ePTFE film-laminated sheet of this invention has a specific surface area of 9.0 m²/g or higher, preferably 9.5 m²/g or higher, and more preferably 10.0 m²/g or higher. With an increase in specific surface area, all of strength, creep resistance, and adhesiveness between ePTFE films can be made excellent, although small nodes are formed in large numbers and fibrils are formed without allowing lamellae to be further aggregated. The upper limit of specific surface area is not particularly limited, but may be, for example, about 15 m²/g or lower, particularly about 12 m²/g or lower.

The ePTFE film-laminated sheet may have a matrix strength of, for example, 120 MPa or higher, preferably 150 MPa or higher, and more preferably 180 MPa or higher, in at least one direction among in-plane directions of the sheet. The upper limit of matrix strength is not particularly limited, but may be, for example, about 250 MPa or lower, particularly about 230 MPa or lower. The ratio of matrix strengths in two orthogonal directions (e.g., matrix strength in the transverse direction/matrix strength in the machine direction) may be, for example, from about 0.5 to about 2, preferably from about 0.7 to about 1.4, and more preferably from about 0.9 to about 1.1.

The matrix strength is a value calculated according to the formula described below, based on the tensile strength "T" of the ePTFE film-laminated sheet, the apparent density (bulk density) "$\rho_1$" of the ePTFE film-laminated sheet, and the true density (2.2 g/cm³) "$\rho_2$" of PTFE.

$$\text{Matrix strength} = T \times \rho_2 / \rho_1$$

In addition, the creep characteristics of the ePTFE film-laminated sheet can be evaluated by stress-relaxation rate. The ePTFE film-laminated sheet of this invention may have a stress-relaxation rate of, for example, 45% or lower, preferably 40% or lower, and more preferably 35% or lower, after 1 hour when compressed at a surface pressure of 50 MPa. The lower limit of stress-relaxation rate is not particularly limited, but may be, for example, 20% or higher, particularly 25% or higher.

The adhesiveness between films in the ePTFE film-laminated sheet can be evaluated by 180 degree peeling strength. The ePTFE film-laminated sheet of this invention may have a 180 degree peeling strength of, for example, 0.20 N/mm or higher, preferably 0.25 N/mm or higher, and more preferably 0.30 N/mm or higher, when peeled at the center in the thickness direction of the sheet. The upper limit of peeling strength is not particularly limited, but may be about 3 N/mm or lower, particularly about 2 N/mm or lower.

Each of the ePTFE films may have a thickness of, for example, from about 5 to about 200 µm, preferably from about 10 to about 150 µm, and more preferably from about 15 to about 100 µm. In addition, the ePTFE film-laminated sheet may have a thickness of, for example, from about 0.1 to about 30 mm, preferably from about 0.5 to about 20 mm, and more preferably from about 1 to about 10 mm.

The density (apparent density, bulk density) of the ePTFE film-laminated sheet of this invention is set to be small, specifically lower than 0.75 g/cm³, and preferably 0.70 g/cm³ or lower. To reduce a sheet density, it is necessary to prevent strong pressure from being exerted during thermal compression bonding. When nodes are simply made small as in the prior art, if strong pressure is prevented from being exerted, adhesive properties between ePTFE films becomes insufficient. In this invention, however, since specific surface area is controlled in a prescribed range, there is no possibility that adhesive properties between ePTFE films become insufficient even if strong pressure is prevented from being exerted. If the density of the laminated sheet is reduced by preventing strong pressure from being exerted, sheet characteristics such as cushioning properties (irregularity following properties) and thermal insulation properties can be made excellent. The lower limit of the density of the ePTFE film-laminated sheet may be, for example, about 0.4 g/cm$^3$ or higher, preferably about 0.5 g/cm$^3$ or higher.

To obtain the above-described ePTFE film, as described above, it is important to increase the shearing force in the extrusion step and to increase both the expansion speed and the expansion ratio in the expansion step. To increase the shearing force in the extrusion step, a reduction ratio (a ratio of cross-sectional area between the extrusion cylinder and the extruded product; often abbreviated as R.R.) may be increased. To obtain the ePTFE film of the present invention, it is recommended to set this reduction ratio to be, for example, 100 or higher, preferably 120 or higher, and more preferably 150 or higher. The upper limit of the reduction ratio is not particularly limited, but may be set to be, for example, about 1,500 or lower, preferably about 500 or lower, and more preferably about 300 or lower, from a viewpoint of, for example, ease of extrusion operation.

The expansion speed and the expansion ratio should be set in accordance with the number of expansion and the direction of expansion. For example, when expansion is carried out two times in total sequentially in the machine direction (MD) and in the transverse direction (TD), the expansion speed and the expansion ratio are set as follows.

Machine direction (MD): expansion speed (a value obtained by dividing the expansion ratio by the amount of time required for expansion) may be set to be, for example, 100%/sec or higher, preferably from 200%/sec to 600%/sec, and more preferably from 300%/sec to 500%/sec. The expansion ratio may be set to be, for example, about 3 times or higher, preferably from about 3.5 to about 10 times, and more preferably from about 4.0 to about 8 times.

Transverse direction (TD): expansion speed may be set to be, for example, 50%/sec or higher, preferably from 70%/sec to 500%/sec, and more preferably from 100%/sec to 300%/sec. The expansion ratio may be set to be, for example, 10 times or higher, preferably from 11 to 30 times, and more preferably from 12 to 20 times.

A product of the expansion ratio in the machine direction and the expansion ratio in the transverse direction may be, for example, about 40 times or higher, preferably from about 50 to about 300 times, and more preferably from about 60 to about 200 times. In addition, the expansion temperature is often set to be, for example, lower than the melting point of PTFE (327° C.), preferably from about 280° C. to about 320° C., at a stage of the expansion in the machine direction (primary expansion), and is often set to be, for example, 280° C. or higher, preferably from 300° C. to 380° C., at a stage of the expansion in the transverse direction (secondary expansion).

When expansion is carried out in a sequence and in a number of times, both of which are other than those described above, expansion conditions may appropriately be set to be such that high-speed and high-ratio expansion is achieved as a whole, while making reference to the above-described conditions.

In the extrusion step, one or more lubricants (also referred to as molding aids; for example, solvent naphtha) may usually be used. In addition, the tape obtained by the extrusion step may usually be rolled to a prescribed thickness, and then expanded sequentially in the machine direction and in the transverse direction. However, preliminary expansion (extension treatment) may also sometimes be carried out in the transverse direction (TD) before the expansion in the machine direction. Furthermore, the lubricant or lubricants used in the extrusion step may usually be removed by drying or other techniques at an appropriate stage, for example, at a stage after the preliminary expansion but before the expansion in the machine direction.

The preliminary expansion speed may be, for example, about 300%/sec or lower, preferably from about 150%/sec to about 250%/sec. The preliminary expansion ratio may be, for example, from about 2 to about 20 times, preferably from about 3 to about 10 times. The preliminary expansion temperature may be, for example, from about 50° C. to about 120° C.

The ePTFE films obtained in such a manner are laminated by thermal compression bonding, thereby making it possible to obtain the ePTFE film-laminated sheet of this invention. As described above, the ePTFE film-laminated sheet of this invention is set to have a low density. Therefore, the conditions of thermal compression bonding (heating temperature, compression pressure) can be set in the ranges which can achieve the low density. The heating temperature may be set in a range of, for example, from about 327° C. to about 380° C., preferably from about 350° C. to about 375° C., and more preferably from about 360° C. to about 370° C. The compression pressure may be set in a range which can keep a lamination state of the films, but does not cause the densification of the films.

The sheet of this invention may be one which is obtained by further carrying out the consolidation of the above-described low-density ePTFE film-laminated sheet. The consolidation means the treatment to crush pores in the ePTFE films, and examples thereof may include methods of consolidation by applying heat and pressure, such as methods of rolling an ePTFE film-laminated sheet with heated rolls; methods of compressing an ePTFE film-laminated sheet with a heat pressing machine; and methods of, after placing an ePTFE film-laminated sheet in a bag and vacuuming the bag, applying pressure to the sheet, for example, in an autoclave.

The consolidated ePTFE film-laminated sheet may have a density of, for example, from about 0.75 to about 2.2 g/cm$^3$, preferably from about 1.2 to about 2.1 g/cm$^3$, and more preferably from about 1.7 to about 2.0 g/cm$^3$. In addition, the consolidated sheet may have a thickness of, for example, from about 0.5 to about 6.5 mm, preferably from about 1.0 to about 5.0 mm, and more preferably from about 1.5 to about 3.0 mm.

The ePTFE film-laminated sheet may have, if necessary, at least one fluororesin layer (e.g., film or sheet) having a density of 1.6 g/cm$^3$ or higher, which is formed on at least one surface (one side surface or both side surfaces) thereof or as an intermediate layer thereof (such a sheet is hereinafter referred to as a composite sheet). If at least one high-density fluororesin layer is formed on at least one surface, the penetration of fluids can be prevented in the thickness direction of the sheet. In addition, if at least one high-density fluororesin layer is formed on both side surfaces (both surfaces), the obtained composite sheet is punched out in a ring shape and the obtained ring is consolidated in the vicinity of the inner periphery, thereby making it possible to produce a gasket capable of more highly preventing the penetration of fluids. Furthermore, if at least one high-density fluororesin layer is inserted into any position (as an intermediate layer) in the thickness direction of the sheet, the rigidity of the sheet can be improved.

Preferred examples of the fluororesin layer may include fluororesin layers made of PTFE (PTFE layers). The PTFE layer may preferably have a porosity of 0%. The PTFE layer may be one obtained by consolidation of porous PTFE to completely crush the pores thereof, or may be skived PTFE.

The fluororesin layer can be fixed on the ePTFE film-laminated sheet by an appropriate means, such as thermal compression bonding.

According to this invention, a sheet comprising expanded porous polytetrafluoroethylene films laminated, each of which is composed of nodes and fibrils connecting the nodes, is produced to have an increased specific surface area, and therefore, the creep resistance and matrix strength of the sheet, and the adhesiveness between ePTFE films, can be made excellent.

EXAMPLES

This invention will be explained below more specifically with Examples, but this invention is not limited to the Examples described below. This invention can be, of course, put into practice after appropriate modifications or variations within a range meeting the gists described above and later, all of which are included in the technical scope of this invention.

Example 1

Figure 4:
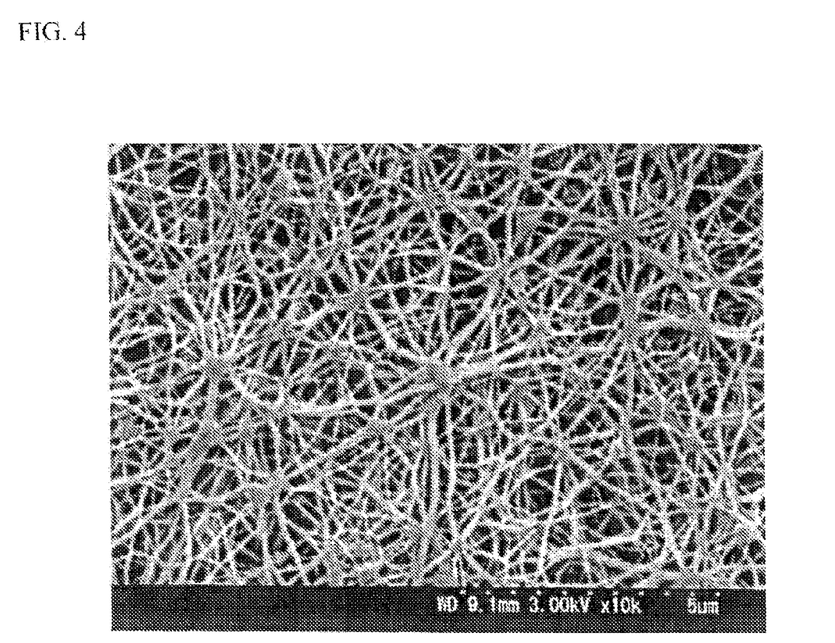
FIG. 4 is a scanning electron microscope photograph of the ePTFE film obtained in Example 1.

A paste obtained by adding, to a PTFE fine powder ("CD123" available from Asahi Glass Co., Ltd.), solvent naphtha as a lubricant in an amount of 17% by mass, and mixing these materials, was compressed into a cylindrical shape. The compressed product was preheated at a temperature of 60° C., and then paste extruded under the conditions that the reduction ratio (R.R.) was 160:1 and the extrusion speed was 15 m/min. After the extrusion, rolling was carried out to obtain a tape having a thickness of 0.6 mm. This tape was subjected to preliminary expansion (extension treatment) in the transverse direction, while keeping the temperature at 80° C., under the conditions that the expansion ratio was 6 times and the expansion speed was 180%/sec, and then, the lubricant was removed by drying. Then, the tape was expanded in the machine direction (length direction), while keeping the temperature at 300° C., under the conditions that the expansion speed was 400%/sec and the expansion ratio was 5 times. Then, the tape was expanded in the transverse direction, while keeping the temperature at 330° C., under the conditions that the expansion speed was 200%/sec and the expansion ratio was 16 times. After the expansion, the tape was sintered by heating at 360° C. to obtain an ePTFE film having a thickness of 0.041 mm and a density of 0.36 g/cm$^3$. Since this ePTFE film was produced by extrusion at a high R.R., and then, expansion at a high speed and at a high ratio, it corresponds to the conceptual diagram in FIG. 3. A scanning electron microscope photograph of this ePTFE film is shown in FIG. 4.

The obtained ePTFE film was wound 125 times around a stainless steel hollow mandrel having a diameter of 1,000 mm and a length of 1,550 mm. This cylindrical layered product was placed in an oven, and sintered at a temperature of 365° C. for 60 minutes. After the baking, the cylindrical layered product was taken out from the oven, and cooled to room temperature. The laminated product was cut open in the axial direction, and the edge portions on four sides were removed by cutting, thereby obtaining two ePTFE film-laminated sheets each having a size of 1,524 mm×1,524 mm, a thickness of 2.8 mm, a density of 0.67 g/cm$^3$, and a mass per unit area of 0.19 g/cm$^2$.

Comparative Example 1

Figure 5:
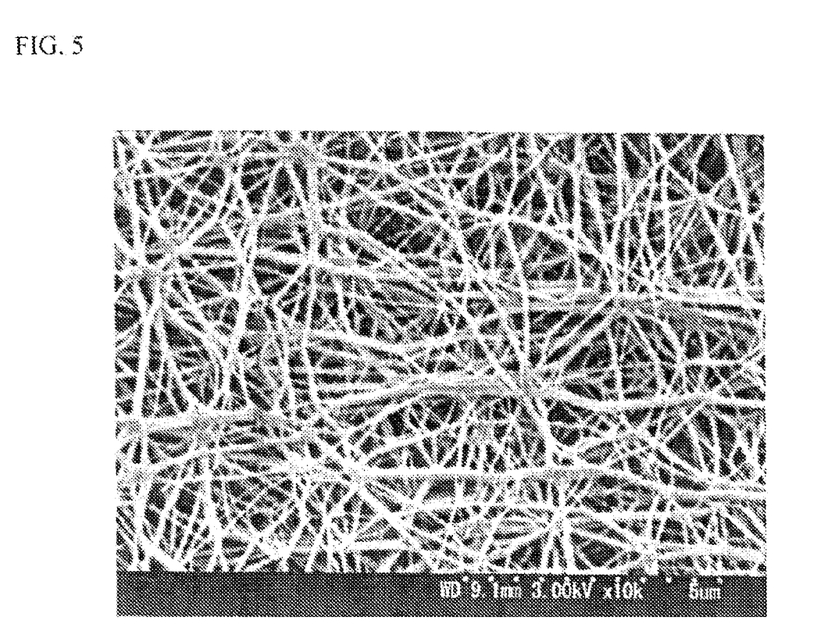
FIG. 5 is a scanning electron microscope photograph of the ePTFE film obtained in Comparative Example 1.

A paste obtained by adding, to a PTFE fine powder ("CD123" available from Asahi Glass Co., Ltd.), solvent naphtha as a lubricant in an amount of 17% by mass, and mixing these materials, was compressed into a cylindrical shape. The compressed product was preheated at a temperature of 50° C., and then paste extruded under the conditions that the reduction ratio (R.R.) was 80:1 and the extrusion speed was 20 m/min. After the extrusion, rolling was carried out to obtain a tape having a thickness of 0.5 mm. The lubricant of this tape was removed by drying, and then, the tape was expanded in the machine direction, while keeping the temperature at 300° C., under the conditions that the expansion speed was 50%/sec and the expansion ratio was 5 times. Then, the tape was expanded in the transverse direction, while keeping the temperature at 380° C., under the conditions that the expansion speed was 200%/sec and the expansion ratio was 18 times. After the expansion, the tape was sintered by heating at 350° C. to obtain an ePTFE film having a thickness of 0.050 mm and a density of 0.30 g/cm$^3$. This ePTFE film is the same as the example of this invention (FIG. 3) in that expansion speed was high in the transverse direction, but this ePTFE film is the same as the conventional example undergoing high-ratio expansion (FIG. 2) in that expansion ratio was increased without increasing reduction ratio (R.R.) and expansion speed was low in the machine direction; therefore, the structure of this ePTFE film can be said to be in between those of FIGS. 2 and 3. A scanning electron microscope photograph of this ePTFE film is shown in FIG. 5.

Using the obtained ePTFE film, two ePTFE film-laminated sheets each having a size of 1,524 mm×1,524 mm, a thickness of 2.9 mm, a density of 0.63 g/cm$^3$, and a mass per unit area of 0.18 g/cm$^2$ were obtained in the same manner as described in Example 1.

Comparative Example 2

Figure 6:
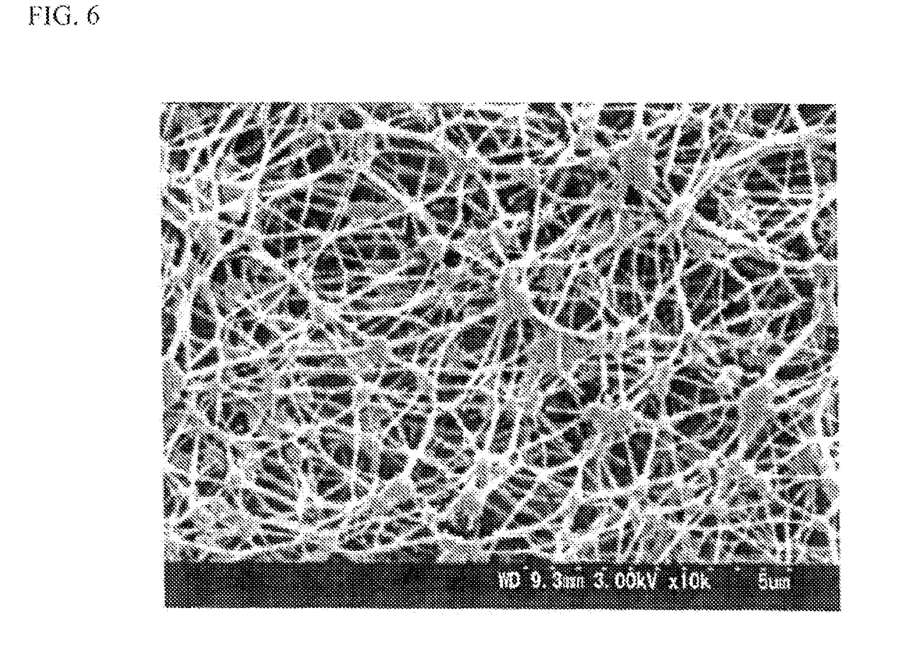
FIG. 6 is a scanning electron microscope photograph of the ePTFE film obtained in Comparative Example 2.

A paste obtained by adding, to a PTFE fine powder ("CD123" available from Asahi Glass Co., Ltd.), solvent naphtha as a lubricant in an amount of 18% by mass, and mixing these materials, was compressed into a cylindrical shape. The compressed product was preheated at a temperature of 50° C., and then paste extruded under the conditions that the reduction ratio (R.R.) was 40:1 and the extrusion speed was 20 m/min. After the extrusion, rolling was carried out to obtain a tape having a thickness of 0.7 mm. This tape was subjected to preliminary expansion (extension treatment) in the transverse direction, while keeping the atmospheric temperature at 80° C., under the conditions that the expansion ratio was 5 times and the expansion speed was 200%/sec, and then, the lubricant was removed by drying. Then, the tape was expanded in the transverse direction, while keeping the temperature at 300° C., under the conditions that the expansion speed was 400%/sec and the expansion ratio was 5 times. Then, the tape was expanded in the transverse direction, while keeping the temperature at 220° C., under the conditions that the expansion speed was 80%/sec and the expansion ratio was 6 times. After the expansion, the tape was sintered by heating at 360° C. to obtain an ePTFE film having a thickness of 0.055 mm and a density of 0.30 g/cm$^3$. This ePTFE film is the same as the conventional example by low-ratio expansion (FIG. 1) in that main expansion ratio was low and main expansion speed was low in the transverse direction, but this ePTFE film can be said to become somewhat near to the example of this invention (FIG. 3) because total expansion ratio including preliminary expansion ratio was increased, and the structure of this ePTFE film can be said to be in between those of FIGS. 1 and 3 because this ePTFE film is the same as the example of this invention (FIG. 3) in that expansion speed was high in the machine direction. A scanning electron microscope photograph of this ePTFE film is shown in FIG. 6.

Using the obtained ePTFE film, two ePTFE film-laminated sheets each having a size of 1,524 mm×1,524 mm, a thickness of 3.1 mm, a density of 0.59 g/cm$^3$, and a mass per unit area of 0.18 g/cm$^2$ were obtained in the same manner as described in Example 1.

Comparative Example 3

Figure 7:
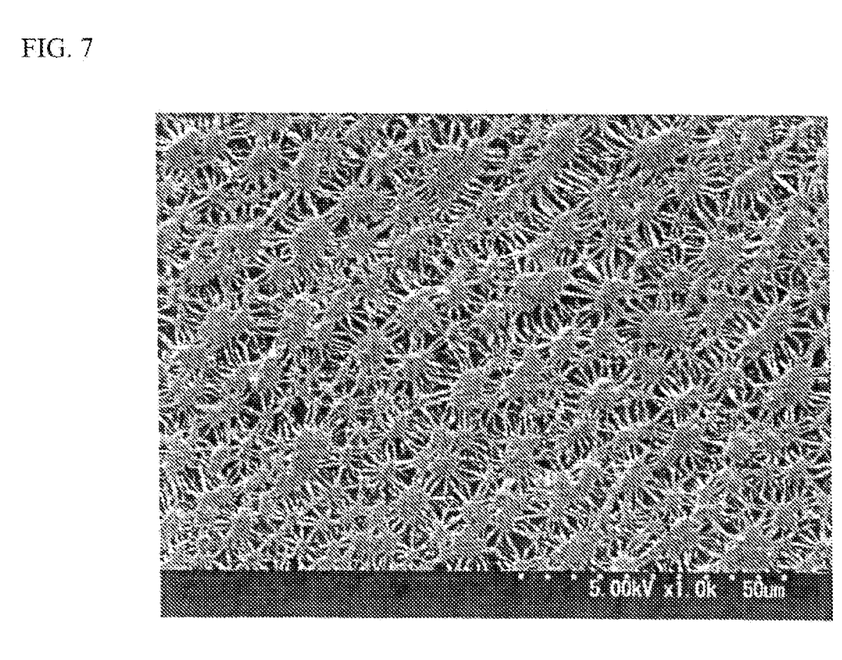
FIG. 7 is a scanning electron microscope photograph of the ePTFE film-laminated sheet obtained in Comparative Example 3.

An ePTFE film-laminated sheet (product name: "SEALON GASKET SHEET", having a size of 1,524 mm×1,524 mm, a thickness of 3.0 mm, a density of 0.85 g/cm$^3$, and a mass per unit area of 0.255 g/cm$^2$), which was purchased from Yeu Ming Tai Chemical Industrial Co., Ltd. in the year 2000, was used. This ePTFE film-laminated sheet corresponds to a working product of Japanese Patent Laid-Open Publication No. 10-237203, having an extremely small expansion ratio (an area ratio of from about 400% to about 800%). A scanning electron microscope photograph of this ePTFE film-laminated sheet is shown in FIG. 7.

Test pieces having a prescribed size were cut out from the ePTFE film-laminated sheets of Example and Comparative Examples, and the following evaluations were carried out. The results are shown in Table 1 below.

(1) Specific Surface Area

A test piece having a length of 100 mm and a width of 100 mm was cut out from each of the sheets, and was cut into small dices each having a length of from 1.2 to 2.0 mm for each side, which were used as a sample for evaluation. The sample was placed in a gas-adsorption measuring apparatus ("BELSORP 18-PLUS" available from BEL Japan, Inc.), and was subjected to deaeration-drying treatment at a temperature of 120° C. for 4 hours, after which an adsorption isotherm of nitrogen gas at liquid nitrogen temperature was measured to calculate a surface area per 1 g of the sample.

(2) Matrix Strength

A dumbbell-shaped type 3 test piece, which is defined by JIS K 6251, was cut out from each of the sheets. The test piece was pulled at a tensile speed of 200 mm/min with a tensile tester, and a tensile strength was determined by dividing a load at which the test piece was broken by a cross-sectional area of the test piece. The matrix strength was calculated according to the formula below.

Matrix strength (MPa)=[Tensile strength (MPa)]×
[Density of non-porous ePTFE: 2.2 g/cm$^3$]/
[Sheet density (g/cm$^3$)]

(3) Peeling Strength

A test piece having a length of 120 mm and a width of 1.45 cm was cut out from each of the sheets. An incision was made by a razor blade nearly in the middle in the thickness direction of the test piece, and the test piece (film-laminated product) was split apart into two for about 50 mm starting from the incision. The two end portions were held between chucks, and were pulled in directions opposite to each other at a tensile speed of 200 mm/min to obtain a maximum load. The 180 peeling strength was determined by dividing the maximum load by the width (1.45 cm) of the test piece.

The measured values of peeling strength are affected by the thickness of the test piece. Therefore, when a sheet to be measured has a thickness of 5 mm or larger, peeling strength is measured after adjusting the thickness of a test piece to 3 mm by pulling and peeling off some part of layers. In the above-described Example and Comparative Examples, since the sheets had a thickness of 3 mm, their peeling strengths were measured without carrying out any adjustment of their thicknesses.

(4) Stress-Relaxation Rate

A test piece having a diameter of 30 mm was cut out from each of the sheets. Using a compression tester, the test piece was compressed with an anvil having a diameter of 6.4 mm. The compression was stopped when the load reached 1.6 kN (corresponding to a surface pressure of 50 MPa). After being left in this condition for 1 hour, the load was read, and a stress-relaxation rate was calculated according to the formula below.

Stress-relaxation rate (%)=[Load after being left for 1
hour (kN)]/[Initial load: 1.6 kN]×100(%)

The measured values of stress-relaxation rate are affected by the mass per unit area (hereinafter referred to as the basis weight) of the sample. Therefore, a test pieces having a basis weight of from 0.17 to 0.20 g/cm$^2$ was used for the measurement of stress-relaxation rate. When the basis weight of the sheet is outside this range, the basis weight was adjusted by pulling and peeling off some part of layers or by layering test pieces. In the above-described Example 1 and Comparative Examples 1 and 2, since the sheets had basis weights of from 0.18 to 0.19 g/cm$^2$, their stress-relaxation rates were measured without carrying out any adjustment of their basis weights. In Comparative Example 3, since the sheet had a basis weight of 0.255 g/cm$^2$, its stress-relaxation rate was measured after adjusting the basis weight to 0.19 g/cm$^2$ by pulling and peeling off some part of layers.

TABLE 1

|  |  | Example 1 | Compar. Example 1 | Compar. Example 2 | Compar. Example 3 |
|---|---|---|---|---|---|
| Specific surface area (m$^2$/g) |  | 10.67 | 8.70 | 6.82 | 3.79 |
| Matrix strength (MPa) | MD direction | 205 | 172 | 96 | 56 |
|  | TD direction | 194 | 183 | 103 | 60 |
| Peeling strength (N/mm) |  | 0.35 | 0.17 | 0.38 | 0.42 |
| Stress relaxation rate (%) |  | 33 | 36 | 47 | 60 |

Comparative Examples 2 and 3 are examples where the specific surface areas were decreased because of low expansion ratios. The ePTFE film-laminated sheets of Comparative Examples 2 and 3 have excellent adhesiveness between ePTFE films, but they have deteriorated creep resistance. Comparative Example 1 is an example where the specific surface area was decreased because of low reduction ratio (R.R.) in the extrusion step despite high expansion ratio. The ePTFE film-laminated sheet of Comparative Example 1 has improved creep resistance, but it has deteriorated adhesiveness.

In contrast to these, since Example 1 was produced under appropriate conditions (high reduction ratio, high expansion speed, and high expansion ratio), it has large specific surface area. Therefore, it has both excellent adhesiveness and excellent creep resistance, and also has excellent matrix strength.

Industrial Applicability

The ePTFE laminated sheet of this invention can be used as, for example, cushioning materials, heat insulation materials, slide materials, and various cover materials. In particular, since the ePTFE laminated sheet of this invention has large specific surface area and has excellent creep resistance, excellent matrix strength, and excellent adhesiveness between ePTFE films, it may more desirably be used for applications on which these characteristics advantageously act. Examples of such preferred applications may include valve sheets, diaphragms, cushion sheets, and gaskets (particularly, gaskets).

When the ePTFE laminated sheet of this invention is applied for gaskets, irregularity-fitting portions (portions for following irregularity on a seal face) of the gaskets may be composed of the ePTFE laminated sheet gasket. Since the ePTFE laminated sheet has excellent fitting (following) properties to the irregularity on a seal face, if the ePTFE laminated sheet is used in the irregularity fitting portion, the ePTFE laminated sheet can be utilized for the prevention of interfacial leakage. Furthermore, gaskets made of the ePTFE laminated sheet of this invention also have excellent adhesiveness between ePTFE films when compared to conventional high-strength and low-creep ePTFE gaskets, and therefore, they can remarkably improve gasket performance.

These gaskets are not particularly limited, so long as their irregularity-fitting portions are composed of the sheet of this invention. For example, those which are cut out from the ePTFE laminated sheet in planar shapes of gaskets (hereinafter referred to as cut-out sheets) may be used as gaskets by themselves. In addition, those which are obtained by overlaying the cut-out sheets on both sides of a core material (a hard member) having an almost identical planar shape may be used as gaskets.

The invention claimed is:

1. A laminated sheet comprising laminated expanded porous polytetrafluoroethylene films, wherein the sheet has a specific surface area of 9.0 $m^2/g$ or higher and a density of from 0.4 $g/cm^3$ to lower than 0.75 $g/cm^3$, wherein the laminated sheet has a 180-degree peeling strength of 0.20 N/mm or higher between the films at the center in the thickness direction of the sheet and wherein the laminated sheet has a stress-relaxation rate of 45% or lower after 1 hour when compressed at a surface pressure of 50 MPa, and wherein the laminated sheet has a thickness of from about 0.1 mm to about 300 mm.

2. The laminated sheet of claim 1, wherein the sheet has a matrix strength of 120 MPa or higher in at least one direction among in-plane directions of the sheet and has a ratio of matrix strengths of from 0.5 to 2 in two orthogonal directions among in-plane directions of the sheet.

3. The laminated sheet of claim 1, further comprising a fluororesin layer having a density of 1.6 $g/cm^3$ or higher on a surface, or as an intermediate layer, of the laminated sheet.

4. The laminated sheet of claim 1, wherein at least one of the expanded porous polytetrafluoroethylene films is produced by extrusion of a polytetrafluoroethylene powder at a reduction ratio of 100 or higher to form a tape, expanding the tape at an expansion speed of 100%/sec or higher and at an expansion ratio of 3 times or higher in a machine direction of the tape, and then expanding the tape at an expansion speed of 50%/sec or higher and at an expansion ratio of 10 times or higher in a transverse direction of the tape to obtain a film.

5. A gasket comprising the laminated sheet of claim 4, and having an irregularity-fitting portion for following an irregularity on a seal face.

6. The laminated sheet of claim 4, wherein the sheet has a matrix strength of 120 MPa or higher in at least one direction among in-plane directions of the sheet and has a ratio of matrix strengths of from 0.5 to 2 in two orthogonal directions among in-plane directions of the sheet.

7. The laminated sheet of claim 1, wherein the expanded porous polytetrafluoroethylene films are laminated by thermal compression bonding.

8. The laminated sheet of claim 1, wherein the laminated sheet has a thickness of from about 0.5 mm to about 20 mm.

9. The laminated sheet of claim 1, wherein the density of the sheet is from about 0.5 $g/cm^3$ to about 0.70 $g/cm^3$.

10. The laminated sheet of claim 1, wherein the sheet has a specific surface area of 15 $m^2/g$ or lower.

11. A laminated sheet comprising expanded porous polytetrafluoroethylene films laminated by thermal compression bonding, wherein the sheet has a specific surface area of 9.0 $m^2/g$ or higher and a density of from 0.4 $g/cm^3$ to lower than 0.75 $g/cm^3$, wherein the laminated sheet has a 180-degree peeling strength of 0.20 N/mm or higher between the films at the center in the thickness direction of the sheet, wherein the sheet has a stress-relaxation rate of 45% or lower after 1 hour when compressed at a surface pressure of 50 MPa, and wherein the laminated sheet has a thickness from about 0.1 mm to about 300 mm.

12. The laminated sheet of claim 11, wherein the sheet has a specific surface area of 10.0 $m^2/g$ or higher.

13. The laminated sheet of claim 11, wherein the sheet has a specific surface area of 15 $m^2/g$ or lower.

14. The laminated sheet of claim 11, wherein the sheet has a matrix strength of 120 MPa or higher in at least one direction among in-plane directions of the sheet and has a ratio of matrix strengths of from 0.5 to 2 in two orthogonal directions among in-plane directions of the sheet.

15. A laminated sheet comprising expanded porous polytetrafluoroethylene films laminated by thermal compression bonding, wherein the sheet has a specific surface area of from 9.0 $m^2/g$ to 15 $m^2/g$ and a density of from 0.4 $g/cm^3$ to lower than 0.75 $g/cm^3$, wherein the laminated sheet has a 180-degree peeling strength of 0.20 N/mm or higher between the films at the center in the thickness direction of the sheet, wherein the laminated sheet has a stress-relaxation rate of 45% or lower after 1 hour when compressed at a surface pressure of 50 MPa, and wherein the laminated sheet has a thickness of from about 0.1 mm to about 300 mm.

* * * * *